March 18, 1958
M. W. FORTH ET AL
2,827,154
SNUBBING MEANS FOR BALE-HANDLING MACHINE
Filed Jan. 26, 1956
2 Sheets-Sheet 1
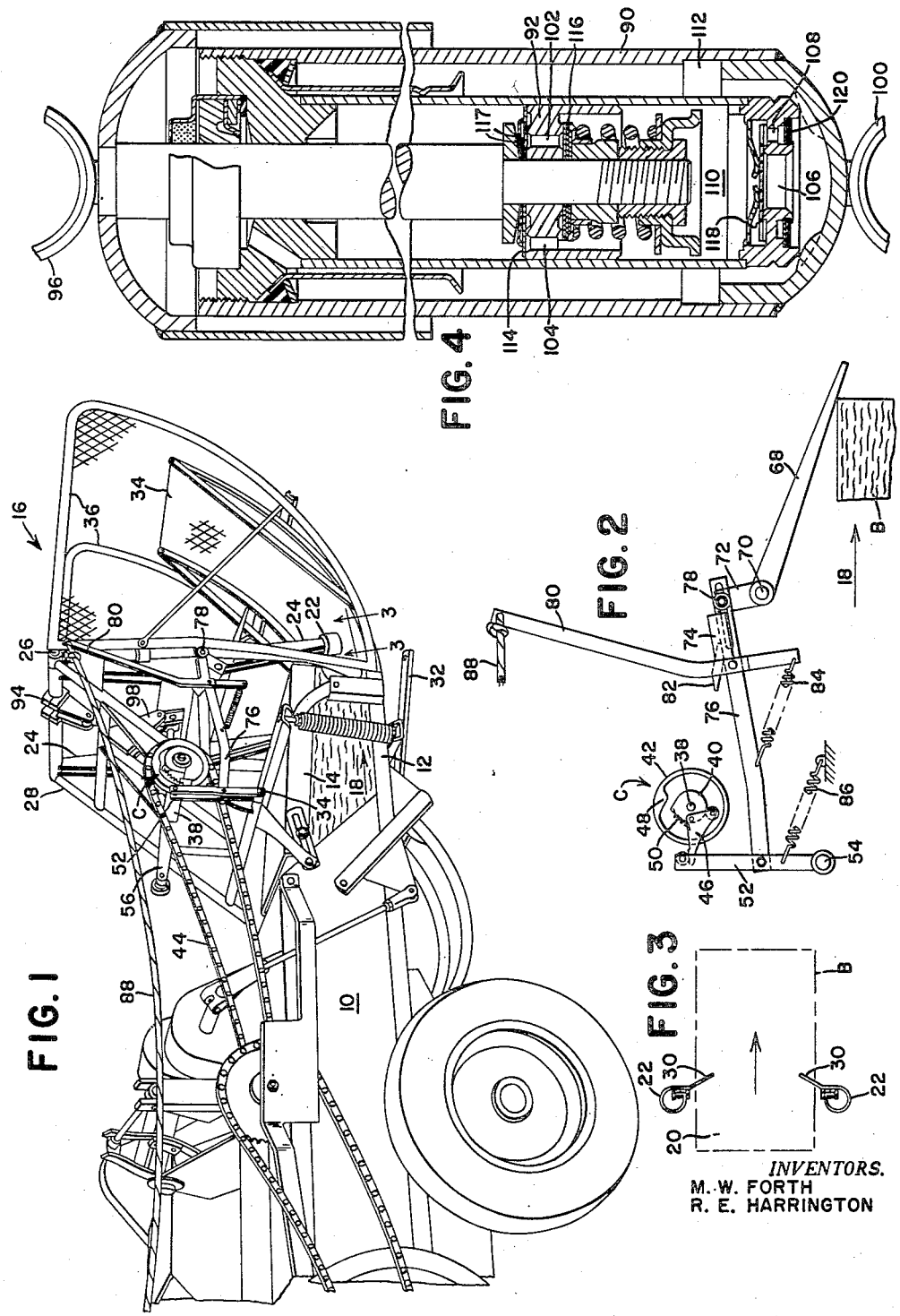
INVENTORS.
M. W. FORTH
R. E. HARRINGTON

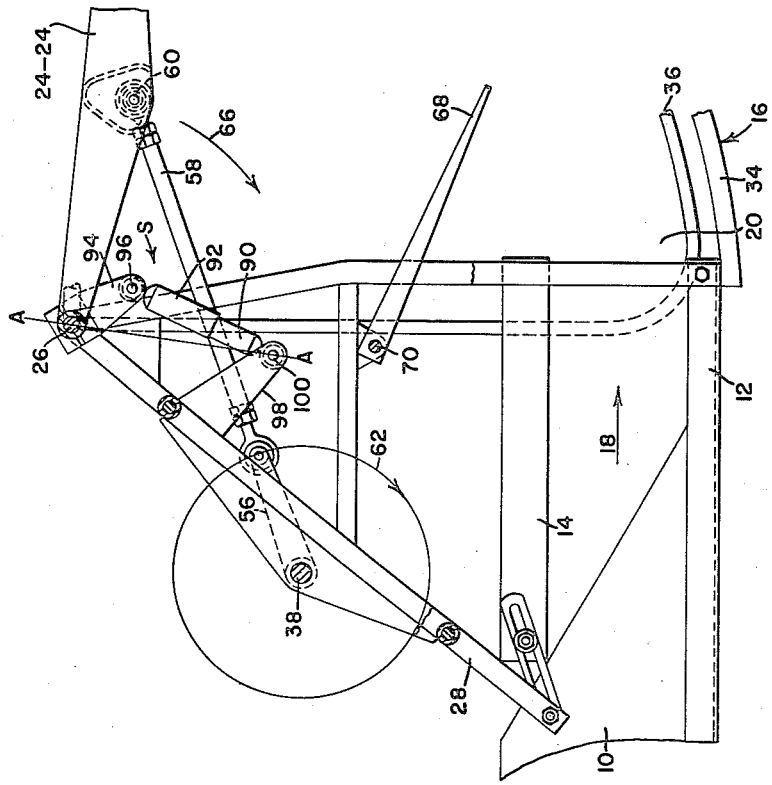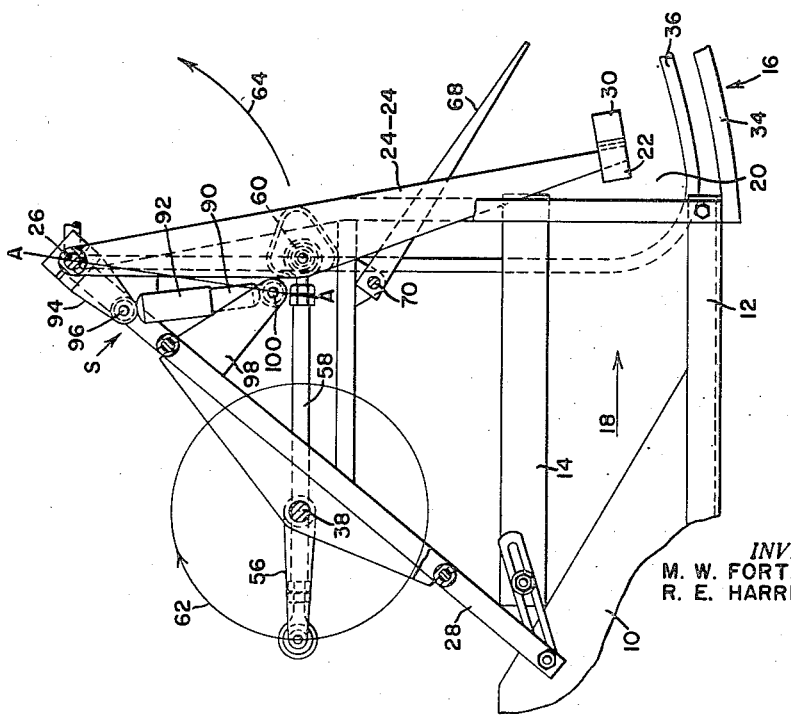

United States Patent Office  2,827,154
Patented Mar. 18, 1958

2,827,154

SNUBBING MEANS FOR BALE-HANDLING MACHINE

Murray W. Forth and Roy E. Harrington, Moline, Ill., assignors to Deere & Company, Moline, Ill., a corporation of Illinois Application January 26, 1956, Serial No. 561,455

10 Claims. (Cl. 198—128)

This invention relates to article-handling apparatus and more particularly to such apparatus as is adapted for the handling of bales delivered by an agricultural baler, one embodiment of which forms the subject matter of assignee's copending application Ser. No. 501,126, filed April 13, 1955 and now U. S. Patent No. 2,756,865.

The machine there disclosed is part of an agricultural baler of conventional construction which operates to deliver formed bales in succession at a bale discharge or rear end of the bale case of the baler, the machine or apparatus for handling the bales including a swingably mounted throwing arm movable on a throwing or propelling stroke from a starting position to a delivery position and returnable on a return stroke to the starting position to receive another bale. The mechanism operates on the principle that the bale throwing arm in its starting position releasably engages a bale and as it moves to its delivery position, the bale-engaging means is released and the momentum of the bale carries it beyond said delivery position as the throwing arm decelerates. Power for the throwing arm is supplied by power means that is successively accelerative and decelerative on the throwing stroke and is also accelerative and decelerative on the return stroke. Because of the magnitude of forces developed in the operation of the mechanism, it has been determined that some form of means is desirable for snubbing the action of the throwing arm or element, particularly as the arm reaches the ends of its strokes. Accordingly, the principal object of the present invention relates to improved snubbing means for the purpose indicated.

The novel design features the use of extensible and contractible link means arranged to lengthen and shorten on each stroke of the throwing arm, together with a resistance device for opposing changes in length in those phases of operation substantially coincident with the action of the throwing arm as it approaches the ends of its strokes. A specific feature of the invention resides in the utilization of a fluid-receivable cylinder and piston assembly including fluid-flow-restriction means for regulating the flow of fluid, as from one side to the other of the piston.

The foregoing and other important objects and desirable characteristics inherent in and encompassed by the invention will become apparent as a preferred embodiment thereof is disclosed in detail in the ensuing specification and accompanying sheets of drawings, the several figures of which will be described immediately below.

Fig. 1 is a fragmentary perspective of the rear portion of a baler and the bale-handling apparatus.

Fig. 2 is an enlarged fragmentary elevation of the control mechanism for effecting actuation of the apparatus.

Fig. 3 is a bottom plan view of the bale-engaging means as would be seen substantially along the line 3—3 of Fig. 1.

Fig. 4 is a an enlarged vertical section through the cylinder and piston assembly of the snubbing means.

Fig. 5 is a fragmentary elevation of the throwing apparatus, showing the throwing or bale-moving element in its starting position.

Fig. 6 is a similar view, but showing the throwing element in its delivery position.

Those familiar with the general characteristics of agricultural balers will recognize in Fig. 1 the rear portion of such baler as embodying a bale case 10 having a rearwardly directed floor 12 and yieldably mounted top 14 which together afford a bale case extension from which completely formed bales emerge in succession for handling by the bale-handling apparatus, which itself is designated as a whole by the numeral 16. The direction of emergence of the bales is indicated by the arrow 18. As each bale emerges from the bale case extension 12—14, it passes into what might be called a bale-entry zone 20 at the front of the apparatus 16, at which point the bale, as designated by the letter B in Fig. 3, is engaged by a pair of bale-engaging means 22. These means are carried respectively by the lower ends of a bale-moving element comprising a pair of rigidly interconnected arms 24 supported at their upper ends by and depending from a cross shaft or pivot 26 that forms part of the framework or supporting structure 28 of the apparatus 16.

Power means, to be described subsequently, causes swinging of the bale-moving element 24—24 from a starting position (Figs. 1 and 5) to a delivery position (Fig. 6), the arrangement being such that the bale-engaging means 22 grip the bale and incur movement of the bale with the element 24—24 as the element swings to its delivery position. The means 22 are each so constructed that their prongs or teeth 30 extend rearwardly and inwardly and thus bite into the bale B but, as the bale-throwing element 24—24 decelerates at the end of its delivery or propelling stroke, the means 22 are releasable so that the momentum of the bale carries it upwardly and rearwardly beyond the delivery position of the element 24—24. In short, the bale is trajected into a trailer (not shown) towed by the baler, as via a trailer hitch 32. An arcuate floor or chute 34 serves to guide the bale in the initial stages of its rearward and upward travel. Side frames 36, preferably including conventional wire mesh, are provided as safety guards on opposite sides of the apparatus 16.

From the foregoing, it will be seen that swinging movement of the element 24—24 is cyclic; that is, the movement comprises alternate delivery and return strokes as the element moves between its starting and delivery positions. The motivating force for the element 24—24 is furnished by power means comprising a crankshaft 38 journaled on the supporting structure or framework 28 and intermittently driven by a one-revolution clutch C. This clutch may be of any conventional construction and includes a driven part 40, keyed to the crankshaft 38, and a driving part 42 journaled on the shaft 38 and chain driven as at 44 from any suitable power source on the baler. The driven part 40 carries a pivoted pawl 46 that is engageable with and disengageable from a driving lug 48 on the driving part 42. A spring 50 normally urges the pawl into engagement with the driving lug 48, but an actuator 52 is pivoted at 54 on the framework 28 and has an idle position (Fig. 2) in which it keeps the pawl 46 out of engagement with the driving lug; and hence, the clutch C is idle and the crankshaft 38 is immobilized.

The end of the crankshaft opposite the clutch C has fixed thereto a crank arm 56 which is connected by a pitman 58 to a cross member 60 on the bale-throwing element 24—24. When the clutch C is engaged, the crank arm 56 rotates in a clockwise direction, as indicated by the arrow 62 in Figs. 5 and 6, moving through a cycle of 360°, which cycle is terminated by subsequent automatic disengagement of the clutch C. The circular motion of the crank 56 imparts an oscillating or swinging motion to the element 24—24, incurring movement of the element from the starting position of Fig. 5 to the delivery position of Fig. 6, the element traveling as indicated by the arrow 64, following which the element is returned from its delivery position to its starting position, following the arrow 66 (Fig. 6).

As disclosed in the patent first identified above, the linkage used to translate the rotation of the crank 56 into oscillation of the throwing element involves successive acceleration, then deceleration, then acceleration and finally deceleration as it comes to rest when the clutch is disengaged, and is so designed as to produce higher rates of acceleration and deceleration on the throwing stroke than on the return stroke. In other words, the horizontal component of the crank starts from an idle position (Fig. 5) and accelerates and then decelerates through a delivery phase terminated temporarily when the status of Fig. 6 is attained, after which said component accelerates and then decelerates until the position of Fig. 5 is attained. It is this successive acceleration and deceleration, together with the releasable means 22—22, which establishes the ability of the apparatus to throw rather than merely to push the bale. This characteristic, combined with automatic control, to be presently described, makes the machine a highly efficient and useful product.

The automatic control of the clutch C, and consequently of the throwing function, stems from the utilization of a bale-sensing member 68, which is pivoted at 70 on a rockshaft carried by the supporting structure or framework 28. Normally, the sensing member 68 extends downwardly into the path of an emerging bale B, as best shown in Figs. 2 and 3. As the bale gradually emerges into the bale entry zone 20 under the influence of a succeeding bale being formed in the bale case 10, an arm 72 on the sensing member approaches a lug 74 on an actuating lever 80 pivotally carried by a force transmitting link 76 that is connected at one end to the clutch control lever 52 and that is supported at its other end by a roller and slot means 78 on the arm 72. The actuating lever 80 is pivoted to the link 76 and has the lug 74 rigidly affixed thereto and, as long as the lever is in the position shown in Fig. 2, in which position it is maintained by the co-action of a stop 82 and a spring 84, counterclockwise rocking of the sensing member 68 and arm 72 will ultimately drive the link 76 forwardly, resulting in releasing of the clutch pawl 46 from the control lever 52, whereupon the pawl will engage with the clutch driving lug 48 and one revolution of the clutch will follow. As the bale B is moved outwardly by the throwing element 24—24, the sensing member 68 returns to its starting position, by the force of gravity, and the spring 84 in conjunction with another spring 86 returns the lever 52 to its idle position and upon the completion of one revolution of the clutch, the pawl 46 is reengaged by the lever 52 and thus is disengaged from the clutch lug 48, terminating that phase of operation of the clutch. Although not important in this particular case, the actuator lever 80 is also capable of being manually controlled, as by a pull rope 88, which extends forwardly to be convenient to an operator on the vehicle (not shown) that draws the baler. A pull on the rope 88 will rock the actuator 80 forwardly or in a counterclockwise direction until the stop 82 engages the link 76, after which the lever and link will move as one and will shift the clutch control lever 52 forwardly to release the pawl 46. In normal operation, automatic functioning is used, but the manual control is important in instances in which it is desired to trip the clutch prematurely, as when the baler and trailing wagon are turning a corner and the resulting angularity would be such that the trajected bale would miss the wagon.

In order that action of the element 24—24 may be controlled or regulated, particularly as respects its acceleration and deceleration, the apparatus 16 includes as a component part thereof snubbing means designated generally by the letter S. The general nature and construction of the snubbing means is such that it possesses the characteristic of affording resistance or a snubbing effect to movement of the throwing element 24—24 as the throwing element approaches the respective ends of its strokes. More specifically, the object of the snubbing means is to function primarily as means for absorbing the kinetic energy of the throwing element 24—24 and associated linkages during the parts of the cycle where rapid deceleration occurs. In addition, it is desired that the snubbing means offer the least possible resistance to the rapid acceleration of element 24—24 which is required to impart a throwing action on the bale rather than merely pushing.

One of the basic parts of the snubbing means is an extensible and contractible link means in the form of a cylinder and piston assembly including a cylinder or link part 90 and a piston or second link part 92. In the preferred embodiment shown, the cylinder and piston assembly is a typical hydraulic shock absorber; although, any other suitable fluid-receivable assembly could be used, as could, broadly, any other means having the characteristics herein referred to.

The cross shaft 26, which affords the pivot axis for the element 24—24, is rigidly secured to the element arms and has rigidly affixed thereto an arm 94, to which the piston rod of the piston 92 is pivotally connected at 96. A bracket 98 is rigidly mounted on the supporting structure 28 in spaced relation to (preferably below) the pivot 26 and affords a pivotal connection at 100 for the lower end of the cylinder 90.

When the throwing element 24—24 is in its starting position (Fig. 5) the overcenter linkage established by the arm 94 and cylinder and piston assembly is ahead of a straight line A—A drawn between the points 26 and 100; and in the delivery position of the element 24—24, the linkage is to the other side of the line A—A (Fig. 6). Hence, as the linkage moves from the position of Fig. 5 to the position of Fig. 6, its length will change; specifically, and in the embodiment here shown, the length will shorten from an initial elongated status (Fig. 5) and will then re-attain substantially its initial length or status (Fig. 6). The lengthening and shortening of the assembly 90—92 is utilized to set up resistances to movement of the element 24—24 and the resistance device thus employed is exploited to the extent that control is achieved at the starting and delivery positions of the element 24—24. Stated otherwise, the resistances occur substantially simultaneously with the two decelerative phases of the swinging cycle of the element.

For the above purpose, the resistance device here takes the form of fluid-flow-restriction means residing in a pair of orifices 102 and 104 in the piston 92 and a port 106 and an orifice 108 in a bottom portion of the cylinder 90, which latter port and orifice communicate an interior cylinder chamber 110 with an outer cylinder chamber 112. The port or orifice 104 is controlled by an upper check valve 114 and the other piston port or orifice 102 is controlled by a pressure relief valve 116. The check valve 114, as is conventional, comprises a flat washer and a spring washer, and these are apertured in alinement, as at 117, in register with the orifice 102. In the lower part of the cylinder, the central or larger port 106 is controlled by a check valve 118 and the smaller port or orifice 108 is controlled by a pressure relief valve 120. The arrangement, as will be described in detail below, is such as to enable relatively free flow of fluid through the piston in an upward direction and to provide restricted flow of fluid downwardly through the piston. Stated otherwise, the arrangement is such that the restriction to fluid flow, and consequently the resistance afforded, is greater upon elongation of the assembly 90—92 than it is upon shortening of the assembly. Therefore, as the arm 94 swings in a counterclockwise direction (Fig. 5) the point 96 will approach not only the line A—A but will also approach the point 100, thus shortening the assembly 90—92 at a position approximately midway between starting and delivery positions. During this much of the operation, fluid transfer through the piston is possible at a relatively rapid rate. However, as the assembly 90—92 begins to elongate again as it travels from the mid-position on the line A—A to the status or position of elongation in Fig. 6, fluid interchange from one side to the other of the piston is met with increased resistance. This resistance will, of course, vary directly with the rate of extension or elongation of the assembly 90—92.

The foregoing will be more readily understood from the following description of the fluid interchange. As previously stated, the cylinder 90 includes the chambers 110 and 112, the latter serving as a fluid reservoir. When the assembly 90—92 is shortened, which involves downward travel of the piston 92, the fluid from the chamber 110 below the piston travels upwardly through the port or orifice 104 (but not through the port 102), tending to unseat the check valve 114, the bias of which is relatively light. Since the piston rod, attached to the piston, occupies some of the space above the piston, there will be a volumetric deficiency in accommodation for the interchanged fluid; that is, not all of the fluid tended to be displaced by downward travel of the piston can be accommodated above the piston. Hence, pressure is built up against the lower relief valve 120 and the excess fluid is transferred to the reservoir or chamber 112.

Upon extension of the assembly, the piston moves upwardly and fluid above the piston must travel downwardly not through the port 104 but through the aperture 117 and port or orifice 102, which is normally closed by the pressure relief valve 116, the bias of which is considerably greater than that of the check valve 114. Concomitant with upward movement of the piston is the necessity of replenishing the chamber 110 with fluid from the chamber or reservoir 112, which is accomplished by fluid flow through the port 106 as the check valve 118 opens. In lieu of the valved ports, ports of fixed restrictions of adequate flow-control characteristics could be employed.

Details of the operational characteristics of the mechanism are deemed to be sufficiently apparent without elaboration. Features and advantages of the invention, not categorically enumerated herein, will undoubtedly occur to those versed in the art, as will many modifications and alterations in the preferred embodiment disclosed, all of which may be achieved without departure from the spirit and scope of the invention.

What is claimed is:

1. Apparatus for handling bales or the like, comprising: supporting structure having an upper pivot; a bale-moving element supported by and depending from said upper pivot for cyclic swinging from a starting position to a delivery position and back to said starting position; power means for swinging the bale-moving element and successively accelerative and decelerative in a delivery phase to swing the element from its starting position to its delivery position and successively accelerative and decelerative in a return phase to return said element to its starting position; bale-engaging means on a lower portion of the element operative to engage a bale at the starting position of said element to incur travel of the bale by said element toward said delivery position, said bale-engaging means being releasable from the bale as the element decelerates at said delivery position so that the momentum of the bale carries it beyond said delivery position; a bracket on the supporting structure and spaced below the aforesaid upper pivot; an arm movable with the bale-moving element to travel from a first position remote from the bracket to a second position also remote from the bracket and to return to said first position, said arm approaching and then receding from the bracket as it moves between said first and second positions; and extensible and contractible link means interconnecting the arm and bracket and adapted to shorten and then lengthen as the arm respectively approaches and recedes from the bracket, said link means including a resistance device opposing lengthening thereof.

2. The invention defined in claim 1, in which: the link means comprises a fluid-receivable cylinder and piston and the resistance device comprises fluid-restriction means controlling passage of fluid from one side of the piston to the other and affording greater restriction upon lengthening of said link means than upon shortening of said link means.

3. Apparatus for handling bales or the like, comprising: supporting structure having an upper pivot; a bale-moving element supported by and depending from said upper pivot for cyclic swinging from a starting position to a delivery position and back to said starting position; power means for swinging the bale-moving element and successively accelerative and decelerative in a delivery phase to swing the element from its starting position to its delivery position and successively accelerative and decelerative in a return phase to return said element to its starting position; bale-engaging means on a lower portion of the element operative to engage a bale at the starting position of said element to incur travel of the bale by said element toward said delivery position, said bale-engaging means being releasable from the bale as the element decelerates at said delivery position so that the momentum of the bale carries it beyond said delivery position; a bracket on the supporting structure in spaced relation to the aforesaid upper pivot; an arm movable with the bale-moving element and arranged to swing from one side to the other of a straight line drawn between said bracket and upper pivot; and extensible and retractible link means connected between the bracket and arm and changeable in length as the arm swings across said line, said link means including a resistance device opposing changes in length in said link means incurred as the bale-moving element approaches its delivery and starting position.

4. The invention defined in claim 1, in which: the link means comprises a fluid-receivable cylinder and piston and the resistance device comprises means for restricting the passage of fluid from one side of the piston to the other.

5. Apparatus for handling bales or the like, comprising: supporting structure having an upper pivot; a bale-moving element supported by and depending from said upper pivot for cyclic swinging from a starting position to a delivery position and back to said starting position; power means for swinging the bale-moving element and successively accelerative and decelerative in a delivery phase to swing the element from its starting position to its delivery position and successively accelerative and decelerative in a return phase to return said element to its starting position; bale-engaging means on a lower portion of the element operative to engage a bale at the starting position of said element to incur travel of the bale by said element toward said delivery position, said bale-engaging means being releasable from the bale as the element decelerates at said delivery position so that the momentum of the bale carries it beyond said delivery position; a bracket on the supporting structure in spaced relation to the aforesaid upper pivot; and snubbing means for retarding movement of the bale-moving element as it approaches each of its starting and delivery positions, said snubbing means including an over-center device connected to the bracket and connected to the element at a point in spaced relation to the upper pivot and adapted, as the element swings between its starting and delivery positions, to pass back and forth across a straight line drawn between the bracket and the point of connection of said device to the element, said device including resistance-effecting means operative to create resistances of major values as said device departs from said line.

6. Apparatus for handling bales or the like, comprising: supporting structure; a bale-moving element carried by said structure for cyclic movement on a bale-propelling stroke from a starting position to a delivery position and on a return stroke back to said starting position; power means operatively connected to the bale-moving element and successively accelerative and decelerative in a delivery phase to incur the propelling stroke of said element and successively accelerative and decelerative in a return phase to incur the return stroke of said element; releasable bale-engaging means on said element operative to engage a bale at said starting position to carry the bale on the propelling stroke of said element, said means being releasable from the bale as said element is decelerated at its delivery position so that the momentum of the bale carries it beyond said delivery position; and means connected between the supporting structure and the bale-moving element for snubbing said element upon deceleration thereof on both strokes.

7. The invention defined in claim 6, in which: the snubbing means includes an extensible and contractible link means operative to change in length from and back to an initial status on each stroke of the bale-moving element and arranged to incur said initial status substantially coincidentally with each of the starting and delivery positions of said element, said link means including a resistance device opposing return thereof to said initial status.

8. The invention defined in claim 7, in which: the link means comprises a fluid-receivable cylinder and piston assembly and the resistance device comprises fluid-restriction means controlling passage of fluid from one side of the piston to the other.

9. The invention defined in claim 8, in which: the fluid-restriction means affords a greater restriction to fluid flow as the initial status of the link means is achieved than when said initial status is departed from.

10. Apparatus for handling bales or the like, comprising: supporting structure; a bale-moving element carried by said structure for cyclic movement on a bale-propelling stroke from a starting position to a delivery position and on a return stroke back to said starting position; power means operatively connected to the bale-moving element and successively accelerative and decelerative in a delivery phase to incur the propelling stroke of said element and successively accelerative and decelerative in a return phase to incur the return stroke of said element; releasable bale-engaging means on said element operative to engage a bale at said starting position to carry the bale on the propelling stroke of said element, said means being releasable from the bale as said element is decelerated at its delivery position so that the momentum of the bale carries it beyond said delivery position; and means connected between the supporting structure and the bale-moving element for snubbing said element upon deceleration thereof on at least one of its strokes, said snubbing means comprising a fluid-receivable piston and cylinder assembly having fluid-flow restriction means.

References Cited in the file of this patent

UNITED STATES PATENTS

| | | |
|---|---|---|
| 2,426,544 | Wooldridge | Aug. 26, 1947 |
| 2,695,079 | Brundrett | Nov. 23, 1954 |
| 2,756,865 | Morrison et al. | July 31, 1956 |